(12) United States Patent
Kashiwazaki et al.

(10) Patent No.: US 10,727,538 B2
(45) Date of Patent: Jul. 28, 2020

(54) NONAQUEOUS ELECTROLYTE SECONDARY BATTERY

(71) Applicant: Sumitomo Chemical Company, Limited, Tokyo (JP)

(72) Inventors: Eiko Kashiwazaki, Osaka (JP); Ichiro Arise, Osaka (JP); Chikara Murakami, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 114 days.

(21) Appl. No.: 16/048,505

(22) Filed: Jul. 30, 2018

(65) Prior Publication Data

US 2019/0067731 A1 Feb. 28, 2019

(30) Foreign Application Priority Data

Jul. 31, 2017 (JP) ................................ 2017-148556
May 22, 2018 (JP) ................................ 2018-098274

(51) Int. Cl.

| | |
|---|---|
| *H01M 10/04* | (2006.01) |
| *H01M 10/058* | (2010.01) |
| *H01M 2/16* | (2006.01) |
| *H01M 10/0525* | (2010.01) |
| *H01M 2/14* | (2006.01) |
| *H01M 10/0567* | (2010.01) |

(52) U.S. Cl.
CPC ......... *H01M 10/058* (2013.01); *H01M 2/145* (2013.01); *H01M 2/1653* (2013.01); *H01M 10/0459* (2013.01); *H01M 10/0525* (2013.01); *H01M 10/0567* (2013.01); *H01M 2300/004* (2013.01); *H01M 2300/0037* (2013.01)

(58) Field of Classification Search
CPC .. H01M 2/14; H01M 2/1653; H01M 10/0459; H01M 10/0567; H01M 2300/0037; H01M 2300/004
See application file for complete search history.

(56) References Cited

U.S. PATENT DOCUMENTS

| | | | |
|---|---|---|---|
| 2012/0034518 A1* | 2/2012 | Ishihara ................. | B01D 71/26 429/207 |
| 2017/0179532 A1* | 6/2017 | Archer ................ | H01M 2/1686 |
| 2019/0319308 A1* | 10/2019 | Shatunov .......... | H01M 10/0567 |

FOREIGN PATENT DOCUMENTS

| | | |
|---|---|---|
| JP | 11-130900 | 5/1999 |
| JP | 2007141498 A | 6/2007 |
| JP | 2015-212322 A | 11/2015 |
| JP | 2016-088976 A | 5/2016 |
| WO | WO 2018-021746 | * 2/2018 |

* cited by examiner

*Primary Examiner* — Brittany L Raymond
(74) *Attorney, Agent, or Firm* — Panitch Schwarze Belisario & Nadel LLP

(57) ABSTRACT

As a nonaqueous electrolyte secondary battery whose battery performance is prevented from being deteriorated by charge and discharge, provided is a nonaqueous electrolyte secondary battery including: a nonaqueous electrolyte secondary battery separator having ion permeability barrier energy of not less than 300 J/mol/μm and not more than 900 J/mol/μm per unit film thickness; and a nonaqueous electrolyte containing a given additive in an amount of not less than 0.5 ppm and not more than 300 ppm.

2 Claims, No Drawings

NONAQUEOUS ELECTROLYTE SECONDARY BATTERY

This Nonprovisional application claims priority under 35 U.S.C. § 119 on (i) Patent Application No. 2017-148556 filed in Japan on Jul. 31, 2017 and (ii) Patent Application No. 2018-098274 filed in Japan on May 22, 2018, the entire contents of which are hereby incorporated by reference.

TECHNICAL FIELD

The present invention relates to a nonaqueous electrolyte secondary battery.

BACKGROUND ART

Nonaqueous electrolyte secondary batteries, particularly lithium-ion secondary batteries, have a high energy density, and are therefore in wide use as batteries for personal computers, mobile telephones, portable information terminals, and the like. Such nonaqueous electrolyte secondary batteries have recently been developed as on-vehicle batteries.

As a nonaqueous electrolyte secondary battery, a nonaqueous electrolyte secondary battery which includes a porous film containing a polyolefin as a main component as disclosed in Patent Literature 1 is, for example, known.

CITATION LIST

Patent Literature

[Patent Literature 1]
Japanese Patent Application Publication, Tokukaihei, No. 11-130900 (1999)

SUMMARY OF INVENTION

Technical Problem

According to a nonaqueous electrolyte secondary battery including a separator for a nonaqueous electrolyte secondary battery (hereinafter referred to as a "nonaqueous electrolyte secondary battery separator") which separator is constituted by a conventional porous film as disclosed in Patent Literature 1, there has been a demand that a deterioration of battery performance which deterioration is caused by charge and discharge be improved.

Solution to Problem

The present invention encompasses an invention as described in the following [1] and [2].
[1] A nonaqueous electrolyte secondary battery including:
a nonaqueous electrolyte secondary battery separator having ion permeability barrier energy of not less than 300 J/mol/μm and not more than 900 J/mol/μm per unit film thickness; and
a nonaqueous electrolyte containing an additive in an amount of not less than 0.5 ppm and not more than 300 ppm, the additive having an ionic conductance decreasing rate L of not less than 1.0% and not more than 6.0%, the ionic conductance decreasing rate L being represented by the following expression (A):

$$L=(LA-LB)/LA \quad (A)$$

where: LA represents an ionic conductance (mS/cm) of a reference electrolyte obtained by dissolving $LiPF_6$ in a mixed solvent, containing ethylene carbonate, ethyl methyl carbonate, and diethyl carbonate at a volume ratio of 3:5:2, so that a concentration of the $LiPF_6$ becomes 1 mol/L; and LB represents an ionic conductance (mS/cm) of an electrolyte obtained by dissolving the additive in the reference electrolyte so that a concentration of the additive becomes 1.0% by weight.
[2] The nonaqueous electrolyte secondary battery as described in [1], wherein a capacity maintenance rate after 100 charge-discharge cycles is not less than 90%.

Advantageous Effects of Invention

According to an aspect of the present invention, it is possible to suppress a deterioration of a battery characteristic which deterioration is caused by charge and discharge.

DESCRIPTION OF EMBODIMENTS

The following description will discuss an embodiment of the present invention. Note, however, that the present invention is not limited to the embodiment. The present invention is not limited to arrangements described below, but may be altered in various ways by a skilled person within the scope of the claims. The present invention also encompasses, in its technical scope, any embodiment derived by combining technical means disclosed in differing embodiments. Note that a numerical expression "A to B" herein means "not less than A and not more than B" unless otherwise stated.

A nonaqueous electrolyte secondary battery in accordance with an embodiment of the present invention includes a nonaqueous electrolyte secondary battery separator (later described) and a nonaqueous electrolyte (later described). Members, each constituting the nonaqueous electrolyte secondary battery in accordance with an embodiment of the present invention, and the like will be described below in detail.

[Nonaqueous Electrolyte Secondary Battery Separator]

The nonaqueous electrolyte secondary battery separator in accordance with an embodiment of the present invention has therein many pores, connected to one another, so that a gas and/or a liquid can pass through the nonaqueous electrolyte secondary battery separator from one side to the other side. The nonaqueous electrolyte secondary battery separator in accordance with an embodiment of the present invention typically includes a polyolefin porous film, and is preferably constituted by a polyolefin porous film. Note, here, that the "polyolefin porous film" is a porous film which contains a polyolefin-based resin as a main component. Note that the phrase "contains a polyolefin-based resin as a main component" means that a porous film contains a polyolefin-based resin at a proportion of not less than 50% by volume, preferably not less than 90% by volume, and more preferably not less than 95% by volume, with respect to the whole of materials of which the porous film is made. The polyolefin porous film can be a base material of the nonaqueous electrolyte secondary battery separator in accordance with an embodiment of the present invention.

The polyolefin-based resin more preferably contains a high molecular weight component having a weight-average molecular weight of $3\times10^5$ to $15\times10^6$. In particular, the polyolefin-based resin more preferably contains a high molecular weight component having a weight-average molecular weight of not less than 1,000,000, because the nonaqueous electrolyte secondary battery separator including the polyolefin porous film has higher strength.

Examples of the polyolefin-based resin which is a main component of the polyolefin porous film include, but are not particularly limited to, homopolymers (for example, polyethylene, polypropylene, and polybutene) and copolymers (for example, ethylene-propylene copolymer) each of which homopolymers and copolymers is a thermoplastic resin and is produced through polymerization of a monomer(s) such as ethylene, propylene, 1-butene, 4-methyl-1-pentene, and/or 1-hexene.

The polyolefin porous film can be a layer containing any one of these polyolefin-based resins solely or can be alternatively a layer containing two or more of these polyolefin-based resins. Of these polyolefin-based resins, the polyolefin porous film preferably contains polyethylene because the polyolefin porous film containing polyethylene makes it possible to prevent (shut down) a flow of an excessively large electric current at a lower temperature. In particular, the polyolefin porous film more preferably contains high molecular weight polyethylene which contains ethylene as a main component. Note that the polyolefin porous film can contain a component other than polyolefin, provided that the component does not impair a function of the polyolefin porous film.

Examples of the polyethylene include low-density polyethylene, high-density polyethylene, linear polyethylene (ethylene-α-olefin copolymer), and ultra-high molecular weight polyethylene having a weight-average molecular weight of not less than 1,000,000. Of these polyethylenes, ultra-high molecular weight polyethylene having a weight-average molecular weight of not less than 1,000,000 is still more preferable, and ultra-high molecular weight polyethylene which contains a high molecular weight component having a weight-average molecular weight of $5\times10^5$ to $15\times10^6$ is even more preferable.

A film thickness of the polyolefin porous film is not particularly limited, but is preferably 4 μm to 40 μm, and more preferably 5 μm to 20 μm. The film thickness of the polyolefin porous film is preferably not less than 4 μm, because the polyolefin porous film having such a film thickness makes it possible to sufficiently prevent an internal short circuit of the nonaqueous electrolyte secondary battery. On the other hand, the film thickness of the polyolefin porous film is preferably not more than 40 μm, because the polyolefin porous film having such a film thickness makes it possible to prevent an increase in size of the nonaqueous electrolyte secondary battery.

The polyolefin porous film typically has a weight per unit area of preferably 4 g/m² to 20 g/m², and more preferably 5 g/m² to 12 g/m² so that the nonaqueous electrolyte secondary battery can have a higher weight energy density and a higher volume energy density.

The polyolefin porous film has an air permeability of preferably 30 sec/100 mL to 500 sec/100 mL, and more preferably 50 sec/100 mL to 300 sec/100 mL, in terms of Gurley values, because the polyolefin porous film having such an air permeability exhibits sufficient ion permeability.

The polyolefin porous film has a porosity of preferably 20% by volume to 80% by volume, and more preferably 30% by volume to 75% by volume so that the polyolefin porous film can (i) retain an electrolyte in a larger amount and (ii) obtain a function of more absolutely preventing (shutting down) a flow of an excessively large electric current.

Pores in the polyolefin porous film each have a pore diameter of preferably not more than 0.3 μm, and more preferably not more than 0.14 μm, in view of sufficient ion permeability and of prevention of entry of particles, constituting an electrode, into the pores in the polyolefin porous film.

[Ion Permeability Barrier Energy Per Unit Film Thickness]

In the present invention, ion permeability barrier energy per unit film thickness of the nonaqueous electrolyte secondary battery separator is represented by a value obtained by dividing, by a film thickness of the nonaqueous electrolyte secondary battery separator, activation energy (barrier energy) which ions (for example, $Li^+$), which are charge carriers, consume while passing through the nonaqueous electrolyte secondary battery separator in a case where the nonaqueous electrolyte secondary battery is operated. The ion permeability barrier energy per unit film thickness is an index indicative of how easily the ions pass through the nonaqueous electrolyte secondary battery separator.

In a case where the ion permeability barrier energy per unit film thickness is low, it is possible for the ions to easily pass through the nonaqueous electrolyte secondary battery separator. In other words, interaction between (i) the ions and (ii) a resin wall inside the nonaqueous electrolyte secondary battery separator is weak. In a case where the ion permeability barrier energy per unit film thickness is high, it is not possible for the ions to easily pass through the nonaqueous electrolyte secondary battery separator. In other words, the interaction between (i) the ions and (ii) the resin wall inside the nonaqueous electrolyte secondary battery separator is strong.

According to the nonaqueous electrolyte secondary battery separator in accordance with an embodiment of the present invention, the ion permeability barrier energy per unit film thickness is not less than 300 J/mol/μm and not more than 900 J/mol/μm. This makes it possible to control, to an appropriate speed, a speed at which the ions, which are charge carriers, pass through the nonaqueous electrolyte secondary battery separator in a case where the nonaqueous electrolyte secondary battery including the nonaqueous electrolyte secondary battery separator is operated.

In a case where the ion permeability barrier energy is excessively low and, accordingly, the speed at which the ions pass through the nonaqueous electrolyte secondary battery separator is excessively high, the ions become nonexistent in an electrode (positive electrode) when a charge-discharge cycle is repeated. It is considered that this fact causes a deterioration of the electrode and ultimately causes a deterioration of a battery characteristic of the nonaqueous electrolyte secondary battery.

Therefore, by arranging the ion permeability barrier energy per unit film thickness of the nonaqueous electrolyte secondary battery separator so as to be not less than 300 J/mol/μm, it is possible to prevent the deterioration of the electrode and, accordingly, possible to improve the battery characteristic in a case where the charge-discharge cycle is repeated. Under the circumstances, the ion permeability barrier energy per unit film thickness of the nonaqueous electrolyte secondary battery separator is preferably not less than 320 J/mol/μm, and more preferably not less than 350 J/mol/μm.

In a case where the ion permeability barrier energy is excessively high and, accordingly, the above-described ion permeability is excessively low, stress, applied to the nonaqueous electrolyte secondary battery separator while the ions pass through the nonaqueous electrolyte secondary battery separator, is increased when the charge-discharge cycle is repeated. It is considered that this fact causes a change in pore structure of the nonaqueous electrolyte secondary battery separator and ultimately causes a deterioration of the battery characteristic of the nonaqueous electrolyte secondary battery.

Furthermore, in a case where the ion permeability barrier energy is excessively high, it is considered that the resin wall inside the nonaqueous electrolyte secondary battery separator has an excessively high polarity. In this case, a highly polar by-product, which is derived from the nonaqueous electrolyte and which is generated in a case where the nonaqueous electrolyte secondary battery is operated, clogs voids in the nonaqueous electrolyte secondary battery separator. This may cause a deterioration of the battery characteristic of the nonaqueous electrolyte secondary battery.

Under the circumstances, the ion permeability barrier energy per unit film thickness of the nonaqueous electrolyte secondary battery separator is preferably not more than 800 J/mol/μm, and more preferably not more than 780 J/mol/μm.

[Method for Measuring Ion Permeability Barrier Energy Per Unit Film Thickness]

The ion permeability barrier energy per unit film thickness of the nonaqueous electrolyte secondary battery separator in accordance with an embodiment of the present invention is calculated by the following method.

First, the nonaqueous electrolyte secondary battery separator is cut into a disc-shaped piece having a diameter of 17 mm. The disc-shaped piece is sandwiched between two SUS plates each having a thickness of 0.5 mm and a diameter of 15.5 mm. The electrolyte is injected into a cell thus obtained so as to prepare a coin cell (CR2032 type). As the electrolyte, a solution is used which is obtained by dissolving $LiPF_6$ in a mixed solvent, in which ethylene carbonate (EC), ethyl methyl carbonate (EMC), and diethyl carbonate (DEC) are mixed at a volume ratio of 3:5:2, so that a concentration of the $LiPF_6$ becomes 1 mol/L.

Next, the coin cell thus prepared is placed in a thermostatic bath in which a temperature is set to a given temperature (later described), and a Nyquist plot is obtained with use of an alternating current impedance apparatus (FRA 1255B) and CellTest System (1470E), each manufactured by Solartron, while a frequency is set to 1 MHz to 0.1 Hz and an amplitude is set to 10 mV. A solution resistance $r_0$ of the nonaqueous electrolyte secondary battery separator at the given temperature is determined from a value of an X intercept of the Nyquist plot. With use of obtained values, the ion permeability barrier energy is calculated by the following expressions (1) and (2). The temperature of the thermostatic bath is set to 50° C., 25° C., 5° C., and −10° C.

Here, the ion permeability barrier energy is represented by the following expression (1).

$$k = 1/r_0 = A\exp(-Ea/RT) \quad (1)$$

Ea: ion permeability barrier energy (J/mol)
k: a reaction constant
$r_0$: a solution resistance (Ω)
A: a frequency factor
R: a gas constant=8.314 J/mol/K
T: a temperature of a thermostatic bath (K)

In a case where natural logarithms of both sides of the expression (1) are taken, the following expression (2) is obtained. On the basis of the expression (2), −Ea/R is determined which indicates a slope of a straight line obtained by (i) plotting $\ln(1/r_0)$ with respect to a reciprocal (1/T) of each temperature and (ii) applying a least squares method to a plot thus obtained, and then Ea is calculated by multiplying a value of −Ea/R by a gas constant R. Subsequently, Ea thus calculated is divided by the film thickness of the nonaqueous electrolyte secondary battery separator. In this way, the ion permeability barrier energy per unit film thickness is calculated.

$$\ln(k) = \ln(1/r_0) = \ln A - Ea/RT \quad (2)$$

Note that a value of the frequency factor A is a unique value which does not vary depending on a change in temperature and which is determined depending on an aspect, an amount of electric charges, a size, and the like of the ions that pass through the nonaqueous electrolyte secondary battery separator. The value of the frequency factor A is a value of $\ln(1/r_0)$ in a case where (1/T)=0, and is experimentally calculated from the plot.

The film thickness of the nonaqueous electrolyte secondary battery separator is not particularly limited, but is preferably 4 μm to 40 μm, and more preferably 5 μm to 20 μm.

The film thickness of the nonaqueous electrolyte secondary battery separator is preferably not less than 4 μm, because the nonaqueous electrolyte secondary battery separator having such a film thickness makes it possible to sufficiently prevent an internal short circuit of the nonaqueous electrolyte secondary battery.

On the other hand, the film thickness of the nonaqueous electrolyte secondary battery separator is preferably not more than 40 μm, because the nonaqueous electrolyte secondary battery separator having such a film thickness makes it possible to prevent an increase in size of the nonaqueous electrolyte secondary battery.

The nonaqueous electrolyte secondary battery separator typically has a weight per unit area of preferably 4 $g/m^2$ to 20 $g/m^2$, and more preferably 5 $g/m^2$ to 12 $g/m^2$ so that the nonaqueous electrolyte secondary battery can have a higher weight energy density and a higher volume energy density.

The nonaqueous electrolyte secondary battery separator has an air permeability of preferably 30 sec/100 mL to 500 sec/100 mL, and more preferably 50 sec/100 mL to 300 sec/100 mL, in terms of Gurley values, because the nonaqueous electrolyte secondary battery separator having such an air permeability exhibits sufficient ion permeability.

The nonaqueous electrolyte secondary battery separator has a porosity of preferably 20% by volume to 80% by volume, and more preferably 30% by volume to 75% by volume so that the nonaqueous electrolyte secondary battery separator can (i) retain the electrolyte in a larger amount and (ii) obtain a function of absolutely preventing (shutting down) a flow of an excessively large electric current at a lower temperature.

The pores in the nonaqueous electrolyte secondary battery separator each have a pore diameter of preferably not more than 0.3 μm, and more preferably not more than 0.14 μm, in view of sufficient ion permeability and of prevention of entry of particles, constituting an electrode, into the pores in the nonaqueous electrolyte secondary battery separator.

The nonaqueous electrolyte secondary battery separator in accordance with an embodiment of the present invention can further include a heat-resistant layer, an adhesive layer, a protective layer, and/or the like as necessary, in addition to the polyolefin porous film.

[Method for Producing Polyolefin Porous Film]

Examples of a method for producing the polyolefin porous film include, but are not particularly limited to, a method in which (i) the polyolefin-based resin, a petroleum resin, and a plasticizer are kneaded and then extruded to obtain a sheet-shaped polyolefin resin composition, (ii) the sheet-shaped polyolefin resin composition thus obtained is stretched, (iii) part or all of the plasticizer is removed with use of an appropriate solvent, and (iv) a resultant polyolefin resin composition is dried and heat-fixed.

Specifically, the method can be a method including the following steps of:

(A) melt-kneading a polyolefin-based resin and a petroleum resin in a kneader to obtain a melted mixture;
(B) kneading the melted mixture thus obtained and a plasticizer to obtain a polyolefin resin composition;
(C) extruding, through a T-die of an extruder, the polyolefin resin composition thus obtained, and shaping the polyolefin resin composition into a sheet while cooling the polyolefin resin composition, to obtain a sheet-shaped polyolefin resin composition;
(D) stretching the sheet-shaped polyolefin resin composition thus obtained;
(E) cleaning, with use of a cleaning liquid, a resultant stretched polyolefin resin composition; and
(F) drying and heat-fixing a resultant cleaned polyolefin resin composition to obtain a polyolefin porous film.

In the step (A), the polyolefin-based resin is used in an amount of preferably 6% by weight to 45% by weight, and more preferably 9% by weight to 36% by weight, with respect to 100% by weight of the polyolefin resin composition to be obtained.

Examples of the petroleum resin include: (i) aliphatic hydrocarbon resins each obtained through polymerization of a C5 petroleum fraction, such as isoprene, pentene, and pentadiene, which serves as a main raw material; (ii) aromatic hydrocarbon resins each obtained through polymerization of a C9 petroleum fraction, such as indene, vinyltoluene, and methyl styrene, which serves as a main raw material; (iii) copolymer resins of the resins (i) and (ii); (iv) alicyclic saturated hydrocarbon resins obtained through hydrogenation of the resins (i) to (iii); and (v) mixtures of the resins (i) to (iv). The petroleum resin is preferably an alicyclic saturated hydrocarbon resin. The petroleum resin has a characteristic that the petroleum resin is easily oxidized because the petroleum resin has, in its structure, many unsaturated bonds and many tertiary carbon atoms each of which unsaturated bonds and tertiary carbon atoms easily produces a radical.

By mixing the petroleum resin into the polyolefin resin composition, it is possible to adjust interaction between (i) the charge carriers and (ii) a resin wall inside the polyolefin porous film to be obtained. In other words, it is possible to suitably adjust the ion permeability barrier energy of the nonaqueous electrolyte secondary battery separator.

By mixing the polyolefin-based resin with the petroleum resin which is oxidized more easily than the polyolefin-based resin, it is possible to appropriately oxidize the resin wall inside the polyolefin porous film to be obtained. That is, in a case where the petroleum resin is added to the polyolefin-based resin, the nonaqueous electrolyte secondary battery separator to be obtained has great ion permeability barrier energy, as compared with a case where the petroleum resin is not added to the polyolefin-based resin.

The petroleum resin preferably has a softening point of 90° C. to 125° C. The petroleum resin is used in an amount of preferably 0.5% by weight to 40% by weight, and more preferably 1% by weight to 30% by weight, with respect to 100% by weight of the polyolefin resin composition to be obtained.

Examples of the plasticizer include: phthalate esters such as dioctyl phthalate; unsaturated higher alcohols such as oleyl alcohol; saturated higher alcohols such as paraffin wax and stearyl alcohol; and liquid paraffin.

In the step (B), a temperature inside the kneader at a time when the plasticizer is introduced into the kneader is preferably not lower than 135° C. and not higher than 200° C., and more preferably not lower than 140° C. and not higher than 170° C.

By controlling the temperature inside the kneader to fall within the above range, it is possible to add the plasticizer to the melted mixture of the polyolefin-based resin and the petroleum resin while the polyolefin-based resin and the petroleum resin are suitably mixed together. This makes it possible to more suitably obtain an effect of mixing the polyolefin-based resin with the petroleum resin.

For example, in a case where the temperature inside the kneader at a time when the plasticizer is added to the melted mixture of the polyolefin-based resin and the petroleum resin is excessively low, it is not possible to uniformly mix the polyolefin-based resin with the petroleum resin and, accordingly, may not be possible to appropriately oxidize the resin wall inside the polyolefin porous film. In a case where the temperature is excessively high (for example, not lower than 200° C.), these resins may be deteriorated by heat.

In the step (D), the sheet-shaped polyolefin resin composition can be stretched merely in a machine direction (MD) or alternatively merely in a transverse direction (TD) or alternatively in both of the MD and the TD. Examples of a method for stretching the sheet-shaped polyolefin resin composition in both of the MD and the TD include: a sequential two-way stretching method in which the sheet-shaped polyolefin resin composition is stretched in the MD and then stretched in the TD; and a simultaneous two-way stretching method in which the sheet-shaped polyolefin resin composition is simultaneously stretched in the MD and the TD.

The sheet-shaped polyolefin resin composition can be stretched by drawing the sheet-shaped polyolefin resin composition while holding its edges with use of chucks. Alternatively, the sheet-shaped polyolefin resin composition can be stretched by causing respective rotational speeds of rollers, each for transferring the sheet-shaped polyolefin composition, to be different from each other. Alternatively, the sheet-shaped polyolefin resin composition can be stretched by rolling the sheet-shaped polyolefin resin composition with use of a pair of rollers.

In the step (D), a stretch ratio at which the sheet-shaped polyolefin resin composition is stretched in the MD is preferably not less than 3.0 times and not more than 7.0 times, and more preferably not less than 4.5 times and not more than 6.5 times. A stretch ratio at which the sheet-shaped polyolefin resin composition, having been stretched in the MD, is further stretched in the TD is preferably not less than 3.0 times and not more than 7.0 times, and more preferably not less than 4.5 times and not more than 6.5 times.

A temperature at which the sheet-shaped polyolefin resin composition is stretched is preferably not higher than 130° C., and more preferably 110° C. to 120° C.

In the step (E), the cleaning liquid is not limited to any particular one, provided that the cleaning liquid is a solvent which allows removal of the plasticizer and the like. Examples of the cleaning liquid include: aliphatic hydrocarbons such as heptane, octane, nonane, and decane; and halogenated hydrocarbons such as methylene chloride, chloroform, dichloroethane, and 1,2-dichloropropane.

In the step (F), drying and heat fixing are carried out by heat-treating the cleaned polyolefin resin composition at a specific temperature.

The drying and the heat fixing are usually carried out under atmospheric air with use of an air blowing dryer, a heating roller, or the like.

The drying and the heat fixing are carried out at a temperature of preferably not lower than 100° C. and not higher than 150° C., more preferably not lower than 110° C. and not higher than 140° C., and still more preferably not lower than 120° C. and not higher than 135° C. so that (a) a degree of oxidization of the resin wall inside the polyolefin porous film is further finely adjusted and (b) the interaction between (i) the charge carriers and (ii) the resin wall inside the polyolefin porous film is suitably controlled. Furthermore, the drying and the heat fixing are carried out for preferably not less than 1 minute and not more than 60 minutes, and more preferably not less than 1 minute and not more than 30 minutes.

[Laminated Body]

The nonaqueous electrolyte secondary battery separator included in the nonaqueous electrolyte secondary battery in accordance with an embodiment of the present invention can be arranged so as to include an insulating porous layer disposed on one surface or each of both surfaces of the polyolefin porous film which is included in the nonaqueous electrolyte secondary battery separator and which has been described in the above item [Nonaqueous electrolyte secondary battery separator]. In the following description, the nonaqueous electrolyte secondary battery separator thus arranged may be referred to as a "laminated body." Furthermore, the nonaqueous electrolyte secondary battery separator described in the above item [Nonaqueous electrolyte secondary battery separator] may be referred to as a "separator 1."

[Insulating Porous Layer]

The insulating porous layer is typically a resin layer containing a resin. The insulating porous layer is preferably a heat-resistant layer or an adhesive layer. The insulating porous layer (hereinafter, also referred to as simply a "porous layer") preferably contains a resin that is insoluble in the electrolyte of the nonaqueous electrolyte secondary battery and that is electrochemically stable when the nonaqueous electrolyte secondary battery is in normal use.

The porous layer is disposed on one surface or each of both surfaces of the polyolefin porous film, as necessary, so as to constitute the laminated body. In a case where the porous layer is disposed on merely one surface of the polyolefin porous film, the porous layer is preferably disposed on that surface of the polyolefin porous film which surface faces the positive electrode, more preferably on that surface of the polyolefin porous film which surface comes into contact with the positive electrode, in the nonaqueous electrolyte secondary battery in accordance with an embodiment of the present invention.

Examples of the resin constituting the porous layer include polyolefins; (meth)acrylate-based resins; fluorine-containing resins; polyamide-based resins; polyimide-based resins; polyester-based resins; rubbers; resins each having a melting point or a glass transition temperature of not lower than 180° C.; and water-soluble polymers.

Of the above resins, polyolefins, polyester-based resins, acrylate-based resins, fluorine-containing resins, polyamide-based resins, and water-soluble polymers are preferable. Of the polyamide-based resins, wholly aromatic polyamides (aramid resins) are preferable. Of the polyester-based resins, polyarylates and liquid crystal polyesters are preferable.

The porous layer can contain fine particles. The term "fine particles" herein means organic fine particles or inorganic fine particles, generally referred to as a filler. Therefore, in a case where the porous layer contains fine particles, the above-described resin contained in the porous layer functions as a binder resin which binds (i) the fine particles together and (ii) the fine particles and the polyolefin porous film together. The fine particles are preferably insulating fine particles.

Examples of the organic fine particles contained in the porous layer include resin fine particles.

Specific examples of the inorganic fine particles contained in the porous layer include fillers each made of an inorganic matter such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, or glass. These inorganic fine particles are insulating fine particles. Of these fine particles, the porous layer can contain only one kind of fine particles or can alternatively contain two or more kinds of fine particles in combination.

Of the above fine particles, fine particles made of an inorganic matter are suitable. More preferable are fine particles made of an inorganic oxide such as silica, calcium oxide, magnesium oxide, titanium oxide, alumina, mica, zeolite, aluminum hydroxide, or boehmite. Still more preferable are fine particles made of at least one kind selected from the group consisting of silica, magnesium oxide, titanium oxide, aluminum hydroxide, boehmite, and alumina. Particularly preferable are fine particles made of alumina.

The porous layer contains the fine particles in an amount of preferably 1% by volume to 99% by volume, and more preferably 5% by volume to 95% by volume, with respect to 100% by volume of the porous layer. In a case where the amount of the fine particles falls within the above range, it is less likely that a void, which is formed when the fine particles come into contact with each other, is blocked by the resin or the like. This allows the porous layer to achieve sufficient ion permeability and an appropriate weight per unit area.

The porous layer can contain two or more kinds of fine particles in combination which two or more kinds differ from each other in particle or specific surface area.

The porous layer has a thickness of preferably 0.5 μm to 15 μm (per layer), and more preferably 2 μm to 10 μm (per layer).

In a case where the thickness of the porous layer is less than 0.5 μm (per layer), it may not be possible to sufficiently prevent an internal short circuit caused by breakage or the like of the nonaqueous electrolyte secondary battery. In addition, an amount of the electrolyte retained by the porous layer may be decreased. In contrast, in a case where the thickness of the porous layer is more than 15 μm (per layer), the battery characteristic may be deteriorated.

The porous layer has a weight per unit area of preferably 1 $g/m^2$ to 20 $g/m^2$ (per layer), and more preferably 4 $g/m^2$ to 10 $g/m^2$ (per layer).

A volume of a porous layer constituent component per square meter of the porous layer is preferably 0.5 $cm^3$ to 20 $cm^3$ (per layer), more preferably 1 $cm^3$ to 10 $cm^3$ (per layer), and still more preferably 2 $cm^3$ to 7 $cm^3$ (per layer).

The porous layer has a porosity of preferably 20% by volume to 90% by volume, and more preferably 30% by volume to 80% by volume so that the porous layer can achieve sufficient ion permeability. Pores in the porous layer each have a pore diameter of preferably not more than 3 μm, and more preferably not more than 1 µm, in view of prevention of entry of particles, constituting an electrode, into the pores in the porous layer.

The laminated body in accordance with an embodiment of the present invention has a film thickness of preferably 5.5 µm to 45 µm, and more preferably 6 µm to 25 µm.

The laminated body in accordance with an embodiment of the present invention has an air permeability of preferably 30 sec/100 mL to 1000 sec/100 mL, and more preferably 50 sec/100 mL to 800 sec/100 mL, in terms of Gurley values.

The laminated body in accordance with an embodiment of the present invention can include, in addition to the polyolefin porous film and the insulating porous layer, a publicly known porous film (porous layer) such as a heat-resistant layer, an adhesive layer, and a protective layer as necessary, provided that the publicly known porous film does not prevent the object of the present invention from being attained.

The laminated body in accordance with an embodiment of the present invention has ion permeability barrier energy per unit film thickness which falls within a specific range that is identical to that of the ion permeability barrier energy per unit film thickness of the separator 1. Therefore, it is possible to decrease a resistance increasing rate after the nonaqueous electrolyte secondary battery including the laminated body is repeatedly subjected to a charge-discharge cycle, and accordingly possible to improve a cycle characteristic of the nonaqueous electrolyte secondary battery. The ion permeability barrier energy per unit film thickness of the laminated body can be controlled by, for example, adjusting, by the above-described method (that is, by mixing the petroleum resin into the polyolefin resin composition), the ion permeability barrier energy per unit film thickness of the separator 1 included in the laminated body.

[Method for Producing Laminated Body]

The laminated body in accordance with an embodiment of the present invention can be produced by, for example, a method in which (i) a coating solution (later described) is applied to a surface of the polyolefin porous film and then (ii) the coating solution is dried so that the porous layer is deposited.

Note that, before the coating solution is applied to the surface of the polyolefin porous film, the surface to which the coating solution is to be applied can be subjected to a hydrophilization treatment as necessary.

The coating solution used in a method for producing the laminated body in accordance with an embodiment of the present invention can be prepared typically by (i) dissolving, in a solvent, the resin that can be contained in the porous layer and (ii) dispersing, in the solvent, the fine particles that can be contained in the porous layer. Note, here, that the solvent in which the resin is to be dissolved also serves as a dispersion medium in which the fine particles are to be dispersed. Note, here, that the resin can be alternatively contained as an emulsion in the coating solution, instead of being dissolved in the solvent.

The solvent (dispersion medium) is not limited to any particular one, provided that (i) the solvent does not have an adverse effect on the polyolefin porous film, (ii) the solvent allows the resin to be uniformly and stably dissolved in the solvent, and (iii) the solvent allows the fine particles to be uniformly and stably dispersed in the solvent. Specific examples of the solvent (dispersion medium) include water and organic solvents. Each of these solvents can be used solely. Alternatively, two or more of these solvents can be used in combination.

The coating solution can be formed by any method, provided that it is possible for the coating solution to meet conditions, such as a resin solid content (resin concentration) and a fine particle amount, which are necessary to obtain a desired porous layer. Specific examples of a method for forming the coating solution include a mechanical stirring method, an ultrasonic dispersion method, a high-pressure dispersion method, and a media dispersion method. Note that the coating solution can contain, as a component other than the resin and the fine particles, an additive such as a disperser, a plasticizer, a surfactant, and a pH adjustor, provided that the additive does not prevent the object of the present invention from being attained. Note that the additive can be contained in an amount that does not prevent the object of the present invention from being attained.

A method for applying the coating solution to the polyolefin porous film, that is, a method for forming the porous layer on the surface of the polyolefin porous film is not limited to any particular one. Examples of the method for forming the porous layer include: a method in which the coating solution is applied directly to the surface of the polyolefin porous film and then the solvent (dispersion medium) is removed; a method in which (i) the coating solution is applied to an appropriate support, (ii) the solvent (dispersion medium) is removed so that the porous layer is formed, (iii) the porous layer is pressure-bonded to the polyolefin porous film, and then (iv) the support is peeled off; and a method in which (i) the coating solution is applied to an appropriate support, (ii) the polyolefin porous film is pressure-bonded to a surface of the support to which surface the coating solution is applied, (iii) the support is peeled off, and then (iv) the solvent (dispersion medium) is removed.

The coating solution can be applied to the polyolefin porous film or the support by a conventionally publicly known method. Specific examples of such a method include a gravure coater method, a dip coater method, a bar coater method, and a die coater method.

The solvent (dispersion medium) is generally removed by drying the coating solution. Note that the coating solution can be dried after the solvent (dispersion medium) contained in the coating solution is replaced with another solvent.

[Positive Electrode]

The positive electrode included in the nonaqueous electrolyte secondary battery in accordance with an embodiment of the present invention is not limited to any particular one, provided that the positive electrode is one that is generally used as a positive electrode of a nonaqueous electrolyte secondary battery. Examples of the positive electrode include a positive electrode sheet having a structure in which an active material layer, containing a positive electrode active material and a binder resin, is formed on a current collector. The active material layer can further contain an electrically conductive agent and/or a binding agent.

Examples of the positive electrode active material include materials each capable of being doped with and dedoped of metal ions such as lithium ions or sodium ions. Specific examples of the materials include lithium complex oxides each containing at least one transition metal such as V, Mn, Fe, Co, or Ni.

Examples of the electrically conductive agent include carbonaceous materials such as natural graphite, artificial graphite, cokes, carbon black, pyrolytic carbons, carbon fiber, and a fired product of an organic polymer compound. Each of these electrically conductive agents can be used solely. Alternatively, two or more of these electrically conductive agents can be used in combination.

Examples of the binding agent include: fluorine-based resins such as polyvinylidene fluoride (PVDF); acrylic resin; and styrene butadiene rubber. Note that the binding agent serves also as a thickener.

Examples of the current collector included in the positive electrode (i.e., positive electrode current collector) include electric conductors such as Al, Ni, and stainless steel. Of these electric conductors, Al is more preferable because Al is easily processed into a thin film and is inexpensive.

Examples of a method for producing the positive electrode sheet include: a method in which the positive electrode active material, the electrically conductive agent, and the binding agent are pressure-molded on the positive electrode current collector; and a method in which (i) the positive electrode active material, the electrically conductive agent, and the binding agent are formed into a paste with use of an appropriate organic solvent, (ii) the positive electrode current collector is coated with the paste, and (iii) the paste is dried and then pressured so that the paste is firmly fixed to the positive electrode current collector.

[Negative Electrode]

A negative electrode included in the nonaqueous electrolyte secondary battery in accordance with an embodiment of the present invention is not limited to any particular one, provided that the negative electrode is one that is generally used as a negative electrode of a nonaqueous electrolyte secondary battery. Examples of the negative electrode include a negative electrode sheet having a structure in which an active material layer, containing a negative electrode active material and a binder resin, is formed on a current collector. The active material layer can further contain an electrically conductive agent.

Examples of the negative electrode active material include materials each capable of being doped with and dedoped of metal ions such as lithium ions or sodium ions. Examples of the materials include carbonaceous materials. Examples of the carbonaceous materials include natural graphite, artificial graphite, cokes, carbon black, and pyrolytic carbons.

Examples of the current collector included in the negative electrode (i.e., negative electrode current collector) include electric conductors such as Cu, Ni, and stainless steel. Of these electric conductors, Cu is more preferable because Cu is not easily alloyed with lithium and is easily processed into a thin film.

Examples of a method for producing the negative electrode sheet include: a method in which the negative electrode active material is pressure-molded on the negative electrode current collector; and a method in which (i) the negative electrode active material is formed into a paste with use of an appropriate organic solvent, (ii) the negative electrode current collector is coated with the paste, and (iii) the paste is dried and then pressured so that the paste is firmly fixed to the negative electrode current collector. The paste preferably contains an electrically conductive agent as described above and a binding agent as described above.

[Nonaqueous Electrolyte]

The nonaqueous electrolyte in accordance with an embodiment of the present invention contains an additive in an amount of 0.5 ppm to 300 ppm, the additive having an ionic conductance decreasing rate L of not less than 1.0% and not more than 6.0%, the ionic conductance decreasing rate L being represented by the following expression (A):

$$L=(LA-LB)/LA \quad\quad (A)$$

where: LA represents an ionic conductance (mS/cm) of a reference electrolyte obtained by dissolving $LiPF_6$ in a mixed solvent, containing ethylene carbonate, ethyl methyl carbonate, and diethyl carbonate at a volume ratio of 3:5:2, so that a concentration of the $LiPF_6$ becomes 1 mol/L; and LB represents an ionic conductance (mS/cm) of an electrolyte obtained by dissolving the additive in the reference electrolyte so that a concentration of the additive becomes 1.0% by weight.

The additive is not limited to any particular one, provided that the additive is a compound which meets the above condition (the ionic conductance decreasing rate L represented by the expression (A) is not less than 1.0% and not more than 6.0%). Specific examples of the compound which meets the condition include pentaerythritol tetrakis[3-(3,5-di-tert-butyl-4-hydroxyphenyl)propionate], triethyl phosphate, vinylene carbonate, propanesultone, 2,6-di-tert-butyl-4-methyl phenol, 6-[3-(3-t-Butyl-4-hydroxy-5-methylphenyl)propoxy]-2,4,8,10-tetra-t-butyldibenzo[d,f][1,3,2]dioxaphosphepin, tris(2,4-di-tert-butylphenyl) phosphite, 2-[1-(2-Hydroxy-3,5-di-tert-pentylphenyl)ethyl]-4,6-di-tert-pentylphenyl acrylate, and dibutylhydroxytoluene.

The nonaqueous electrolyte in accordance with an embodiment of the present invention contains an electrolyte substance and an organic solvent, as with the case of a nonaqueous electrolyte generally used for a nonaqueous electrolyte secondary battery. Examples of the electrolyte substance include metal salts such as a lithium salt (e.g., $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$). Each of these electrolyte substances can be used solely. Alternatively, two or more of these electrolyte substances can be used in combination.

Examples of the organic solvent contained in the nonaqueous electrolyte include aprotic polar solvents such as carbonates, ethers, esters, nitriles, amides, carbamates, sulfur-containing compounds, and fluorine-containing organic solvents each obtained by introducing a fluorine group into any of these organic solvents. Each of these organic solvents can be used solely. Alternatively, two or more of these organic solvents can be used in combination.

The organic solvent is preferably a mixed solvent containing a ring compound, such as EC, and a chain compound, such as EMC and DEC, as with the case of the reference electrolyte. The mixed solvent contains the ring compound and the chain compound at a volume ratio of preferably 2:8 to 4:6, more preferably 2:8 to 3:7, and particularly preferably 3:7. Note that the mixed solvent in which the ring compound and the chain compound are mixed at a volume ratio of 3:7 is an organic solvent particularly generally used for a nonaqueous electrolyte of a nonaqueous electrolyte secondary battery.

The additive in accordance with an embodiment of the present invention causes a decrease in the ionic conductance of the reference electrolyte.

It is not clear why it is possible to suppress a deterioration of a battery characteristic by adding the additive in accordance with an embodiment of the present invention to a nonaqueous electrolyte. However, the following reason is, for example, considered. That is, by adding the additive, it is possible to decrease a degree of dissociation of ions in a vicinity of an electrolyte (positive electrode) and suppress non-existence of the ions in the vicinity of the electrode (positive electrode), in a case where a battery is charged and discharged, particularly, in a case where a battery is operated at a high speed. This makes it possible to suppress a deterioration of a battery characteristic which deterioration is caused by charge and discharge.

In view of suppression of non-existence of the ions in a vicinity of the electrode, the nonaqueous electrolyte of the nonaqueous electrolyte secondary battery in accordance with an embodiment of the present invention contains the additive in an amount of not less than 0.5 ppm, preferably not less than 20 ppm, more preferably not less than 45 ppm.

In a case where the nonaqueous electrolyte contains the additive in an excessively large amount, not only the non-existence of the ions in the vicinity of the electrode is suppressed, but also a degree of dissociation of the ions in the entire nonaqueous electrolyte in accordance with an embodiment of the present invention is excessively decreased. This prevents a flow of the ions in the entire nonaqueous electrolyte secondary battery, and rather causes a deterioration of the battery characteristic.

In view of suppression of prevention of the flow of the ions in the entire nonaqueous electrolyte secondary battery, the nonaqueous electrolyte of the nonaqueous electrolyte secondary battery in accordance with an embodiment of the present invention contains the additive in an amount of not more than 300 ppm, preferably not more than 250 ppm, and more preferably not more than 180 ppm.

Note, here, that according to the nonaqueous electrolyte secondary battery in accordance with an embodiment of the present invention, which includes the nonaqueous electrolyte containing the additive in an amount of not less than 0.5 ppm and not more than 300 ppm, the degree of dissociation of the ions in the vicinity of the electrode (positive electrode) in a case where the nonaqueous electrolyte secondary battery is repeatedly charged and discharged, particularly, in a case where the nonaqueous electrolyte secondary battery is operated at a high speed is strongly affected by strength of interaction (compatibility) between the additive and the ions, rather than by a dielectric constant of the organic solvent.

Therefore, according to the nonaqueous electrolyte secondary battery in accordance with an embodiment of the present invention, it is possible to suitably decrease the degree of dissociation of the ions in the vicinity of the electrode (positive electrode), regardless of a kind of the nonaqueous electrolyte in accordance with an embodiment of the present invention. In other words, by the nonaqueous electrolyte containing the additive in an amount of not less than 0.5 ppm and not more than 300 ppm, it is possible to suitably decrease the degree of dissociation of the ions in the vicinity of the electrode (positive electrode), regardless of a kind and an amount of the electrolyte substance contained in the nonaqueous electrolyte and a kind of the organic solvent contained in the nonaqueous electrolyte. As a result, it is possible to suppress a deterioration of the battery characteristic which deterioration is caused by charge and discharge.

That is, it is possible to sufficiently suppress a deterioration of the battery characteristic of the nonaqueous electrolyte secondary battery, by adjusting (i) the ion permeability barrier energy of the nonaqueous electrolyte secondary battery separator to fall within a suitable range as has been described and (ii) the ionic conductance decreasing rate and the amount of the additive contained in the nonaqueous electrolyte to fall within respective specific ranges so that the flow of the ions in the nonaqueous electrolyte secondary battery including the nonaqueous electrolyte secondary battery separator and the nonaqueous electrolyte is suitably adjusted.

Examples of a method for controlling the amount of the additive contained in the nonaqueous electrolyte to be not less than 0.5 ppm and not more than 300 ppm include, but are not particularly limited to, a method in which, in a method for producing the nonaqueous electrolyte secondary battery (later described), the additive is dissolved, in advance, in the nonaqueous electrolyte, which is to be injected into a container that is to serve as a housing of the nonaqueous electrolyte secondary battery, so that the amount of the additive becomes not less than 0.5 ppm and not more than 300 ppm.

[Method for Producing Nonaqueous Electrolyte Secondary Battery]

The nonaqueous electrolyte secondary battery in accordance with an embodiment of the present invention can be produced by a conventionally publicly known method. Examples of the conventionally publicly known method include a method in which (i) the positive electrode, the nonaqueous electrolyte secondary battery separator, and the negative electrode are disposed in this order to form a member for a nonaqueous electrolyte secondary battery (hereinafter referred to as a "nonaqueous electrolyte secondary battery member"), (ii) the nonaqueous electrolyte secondary battery member is placed in a container which is to serve as a housing of the nonaqueous electrolyte secondary battery, (iii) the container is filled with the nonaqueous electrolyte, and then (iv) the container is hermetically sealed while pressure inside the container is reduced.

EXAMPLES

The present invention will be described below in more detail with reference to Examples and Comparative Examples. Note, however, that the present invention is not limited to such Examples.

[Measurement Methods]

Physical properties and the like of nonaqueous electrolyte secondary battery separators, prepared in Examples and Comparative Examples, were measured by methods below. Furthermore, cycle characteristics of nonaqueous electrolyte secondary batteries, prepared in Examples and Comparative Examples, were measured by a method below.

(1) Film Thickness (Unit: μm)

A film thickness of a nonaqueous electrolyte secondary battery separator was measured with use of a high-precision digital length measuring machine (VL-50) manufactured by Mitutoyo Corporation.

(2) Air Permeability (Unit: Sec/100 mL)

An air permeability of a nonaqueous electrolyte secondary battery separator was measured according to JIS P8117.

(3) Ion Permeability Barrier Energy Per Unit Film Thickness of Nonaqueous Electrolyte Secondary Battery Separator (Unit: J/mol/μm)

A nonaqueous electrolyte secondary battery separator was cut into a disc-shaped piece having a diameter of 17 mm. The disc-shaped piece was sandwiched between two SUS plates each having a thickness of 0.5 mm and a diameter of 15.5 mm. An electrolyte was injected into a cell thus obtained so as to prepare a coin cell (CR2032 type). Here, as the electrolyte, a solution was used which was obtained by dissolving $LiPF_6$ in a mixed solvent, in which ethylene carbonate (EC), ethyl methyl carbonate (EMC), and diethyl carbonate (DEC) were mixed at a volume ratio of 3:5:2, so that a concentration of the $LiPF_6$ became 1 mol/L.

The coin cell thus prepared was placed in a thermostatic bath in which a temperature was set to a given temperature (later described). Next, a Nyquist plot was obtained with use of an alternating current impedance apparatus (FRA 1255B) and CellTest System (1470E), each manufactured by Solartron, while a frequency was set to 1 MHz to 0.1 Hz and a voltage amplitude was set to 10 mV. A solution resistance $r_0$ of the nonaqueous electrolyte secondary battery separator at the given temperature was determined from a value of an X intercept of the Nyquist plot. With use of obtained values, ion permeability barrier energy was calculated by the following expressions (1) and (2). The temperature of the thermostatic bath was set to 50° C., 25° C., 5° C., and −10° C.

Here, the ion permeability barrier energy is represented by the following expression (1).

$$k=1/r_0=A\exp(-Ea/RT) \quad (1)$$

Ea: ion permeability barrier energy (J/mol)

k: a reaction constant $r_0$: a solution resistance (Ω)

A: a frequency factor

R: a gas constant=8.314 J/mol/K

T: a temperature of a thermostatic bath (K)

In a case where natural logarithms of both sides of the expression (1) are taken, the following expression (2) is obtained. On the basis of the expression (2), −Ea/R was determined which indicated a slope of a straight line obtained by (i) plotting $\ln(1/r_0)$ with respect to a reciprocal of each temperature and (ii) applying a least squares method to a plot thus obtained, and then Ea was calculated by multiplying a value of −Ea/R by a gas constant R. Subsequently, Ea thus calculated was divided by a film thickness of the nonaqueous electrolyte secondary battery separator. In this way, the ion permeability barrier energy per unit film thickness was calculated.

$$\ln(k)=\ln(1/r_0)=\ln A-Ea/RT \quad (2)$$

(4) Ionic Conductance Decreasing Rate (%)

A reference electrolyte was prepared by dissolving $LiPF_6$ in a mixed solvent, in which ethylene carbonate (EC), ethyl methyl carbonate (EMC), and diethyl carbonate (DEC) were mixed at a volume ratio of 3:5:2, so that a concentration of the $LiPF_6$ became 1 mol/L.

An ionic conductance of the reference electrolyte was measured with use of an electric conductivity meter (ES-71) manufactured by HORIBA, Ltd., and the ionic conductance thus measured was employed as an ionic conductance (LA) of the reference electrolyte to which an additive had not been added.

An additive, used in each of Examples and Comparative Examples, was added to and dissolved in diethyl carbonate so that a concentration of the additive became 20.0% by weight. Subsequently, the reference electrolyte was added to a resultant mixture to prepare an electrolyte in which the additive was dissolved in the reference electrolyte so that the concentration of the additive became 1.0% by weight (hereinafter, referred to a "1.0% by weight additive solution").

Thereafter, an ionic conductance of the 1.0% by weight additive solution was measured with use of the electric conductivity meter (ES-71), and the ionic conductance thus measured was employed as an ionic conductance (LB) of the reference electrolyte to which the additive had been added.

An ionic conductance decreasing rate was calculated by the following expression (A) with use of (i) the ionic conductance of the reference electrolyte to which the additive had not been added and (ii) the ionic conductance of the reference electrolyte to which the additive had been added.

$$L=(LA-LB)/LA \quad (A)$$

L: an ionic conductance decreasing rate (%)

LA: an ionic conductance (mS/cm) of a reference electrolyte to which an additive had not been added LB: an ionic conductance (mS/cm) of an electrolyte obtained by adding the additive to the reference electrolyte (5) Cycle Characteristic: Capacity Maintenance Rate A capacity maintenance rate of a nonaqueous electrolyte secondary battery which had been prepared in each of Examples and Comparative Examples and which had been subjected to 100 charge-discharge cycles was measured by a method below so as to evaluate a cycle characteristic.

The nonaqueous electrolyte secondary battery which had been prepared in each of Examples and Comparative Examples and which had not been subjected to any charge-discharge cycle was subjected to 4 initial charge-discharge cycles. In each of the 4 initial charge-discharge cycles, (i) a temperature was set to 25° C., (ii) a voltage was set to a range of 4.1 V to 2.7 V, and (iii) charge and discharge were carried out at a rate of 0.2 C. Note that 1 C indicates a rate at which a rated capacity derived from a 1-hour rate discharge capacity is discharged in 1 hour. The same applies to the following description.

First, a capacity (initial capacity) of the nonaqueous electrolyte secondary battery which had been subjected to the 4 initial charge-discharge cycles was measured. Next, the nonaqueous electrolyte secondary battery whose initial capacity had been measured was subjected to 100 charge-discharge cycles. In each of the 100 charge-discharge cycles, (i) a temperature was set to 55° C., (ii) constant current charge was carried out at a rate of 1 C, and (iii) constant current discharge was carried out a rate of 10 C. Subsequently, a capacity (capacity after 100 charge-discharge cycles) of the nonaqueous electrolyte secondary battery which had been subjected to the 100 charge-discharge cycles was measured.

A ratio of the capacity after 100 charge-discharge cycles to the initial capacity, which capacities were measured by the above respective methods, was calculated, and employed as a capacity maintenance rate after the 100 charge-discharge cycles.

Example 1

[Preparation of Nonaqueous Electrolyte Secondary Battery Separator]

First, 18 parts by weight of an ultra-high molecular weight polyethylene powder (HI-ZEX MILLION 145M, manufactured by Mitsui Chemicals, Inc.) and 2 parts by weight of a petroleum resin having many tertiary carbon atoms in its structure (alicyclic saturated hydrocarbon resin having a softening point of 90° C.) were prepared. The ultra-high molecular weight polyethylene powder and the petroleum resin were pulverized and mixed with use of a blender. Note that pulverization was carried out until particles of these powders were identical in particle diameter. A mixture 1 was thus obtained.

Next, the mixture 1 was fed to a twin screw kneading extruder with use of a quantitative feeder, and then melt-kneaded in the twin screw kneading extruder. A temperature inside the twin screw kneading extruder immediately before liquid paraffin was fed to the twin screw kneading extruder was set to 144° C., and 80 parts by weight of the liquid paraffin was side-fed to the twin screw kneading extruder with use of a pump. Note that the "temperature inside the twin screw kneading extruder" indicates a temperature inside a segment-type barrel of a twin screw kneading extruder. Note also that the "segment-type barrel" indicates a block-type barrel which can be connected to a different block-type barrel(s) so that connected block-type barrels have an intended total length.

Subsequently, a resultant melt-kneaded mixture 1 was extruded through a T-die, in which a temperature was set to 210° C., via a gear pump so that the melt-kneaded mixture 1 was shaped into a sheet. A sheet thus obtained was employed as a sheet-shaped polyolefin resin composition 1. The sheet-shaped polyolefin resin composition 1 was then wound on a cooling roller so that the sheet-shaped polyolefin resin composition 1 was cooled down. After the sheet-shaped polyolefin resin composition 1 was cooled down, the sheet-shaped polyolefin resin composition 1 was stretched by a sequential stretching method, that is, the sheet-shaped polyolefin resin composition 1 was stretched in an MD at a stretch ratio of 6.4 times and then stretched in a TD at a stretch ratio of 6.0 times to obtain a stretched polyolefin resin composition 2.

The stretched polyolefin resin composition 2 was cleaned with use of a cleaning liquid (heptane). A resultant cleaned sheet (sheet-shaped polyolefin resin composition) was left to stand still for 1 minute in a ventilation oven, in which a temperature was set to 118° C., so that the cleaned sheet was dried and heat-fixed. In this manner, a polyolefin porous film was obtained. The polyolefin porous film thus obtained was employed as a nonaqueous electrolyte secondary battery separator 1.

Thereafter, physical properties of the nonaqueous electrolyte secondary battery separator 1 were measured by the above-described measurement methods. The nonaqueous electrolyte secondary battery separator 1 had a film thickness of 23 μm and an air permeability of 128 sec/100 mL. Table 1 shows the physical properties thus measured of the nonaqueous electrolyte secondary battery separator 1.

[Preparation of Nonaqueous Electrolyte Secondary Battery]

(Preparation of Positive Electrode)

A commercially available positive electrode was used which had been produced by applying $LiNi_{0.5}Mn_{0.3}Co_{0.2}O_2$, an electrically conductive agent, and PVDF (at a weight ratio of 92:5:3) to aluminum foil. The aluminum foil of the commercially available positive electrode was cut so that (i) a first portion of the aluminum foil, on which first portion a positive electrode active material layer was formed, had a size of 40 mm×35 mm and (ii) a second portion of the aluminum foil, on which second portion no positive electrode active material layer was formed and which second portion had a width of 13 mm, remained on an outer periphery of the first portion. A positive electrode thus obtained was used. The positive electrode active material layer had a thickness of 58 μm and a density of 2.50 g/cm$^3$.

(Preparation of Negative Electrode)

A commercially available negative electrode was used which had been produced by applying graphite, a styrene-1,3-butadiene copolymer, and sodium carboxymethylcellulose (at a weight ratio of 98:1:1) to copper foil. The copper foil of the commercially available negative electrode was cut so that (i) a first portion of the copper foil, on which first portion a negative electrode active material layer was formed, had a size of 50 mm×40 mm and (ii) a second portion of the copper foil, on which second portion no negative electrode active material layer was formed and which second portion had a width of 13 mm, remained on an outer periphery of the first portion. A negative electrode thus obtained was used. The negative electrode active material layer had a thickness of 49 μm and a density of 1.40 g/cm$^3$.

(Preparation of Electrolyte)

$LiPF_6$ was dissolved in a mixed solvent, in which ethylene carbonate, ethyl methyl carbonate, and diethyl carbonate were mixed at a volume ratio of 3:5:2, so that a concentration of the $LiPF_6$ became 1 mol/L. A solution thus obtained was employed as an undiluted solution 1 of an electrolyte (aprotic polar solvent electrolyte containing Li$^+$ ions).

Diethyl carbonate was added to 10.2 mg of pentaerythritol tetrakis [3-(3,5-di-tert-butyl-4-hydroxyphenyl)propionate] (having an ionic conductance decreasing rate of 4.0%) serving as an additive, and the additive was dissolved in the diethyl carbonate to obtain 5 mL of an additive solution 1. Then, 90 μL of the additive solution 1 and 1910 μL of the undiluted solution 1 of an electrolyte were mixed to obtain an electrolyte 1. Note that Table 1 below shows an amount of an additive contained in an electrolyte used in each of Examples and Comparative Examples.

(Assembly of Nonaqueous Electrolyte Secondary Battery)

A nonaqueous electrolyte secondary battery was prepared by the following method with use of the positive electrode, the negative electrode, the nonaqueous electrolyte secondary battery separator 1, and the electrolyte 1. The nonaqueous electrolyte secondary battery thus prepared was employed as a nonaqueous electrolyte secondary battery 1.

The positive electrode, the nonaqueous electrolyte secondary battery separator 1, and the negative electrode were disposed (arranged) in this order in a laminate pouch to obtain a nonaqueous electrolyte secondary battery member 1. In so doing, the positive electrode and the negative electrode were arranged so that a main surface of the positive electrode active material layer of the positive electrode was entirely included in a range of a main surface of the negative electrode active material layer of the negative electrode (i.e., entirely covered by the main surface of the negative electrode active material layer of the negative electrode).

Subsequently, the nonaqueous electrolyte secondary battery member 1 was put into a bag which had been formed by disposing an aluminum layer on a heat seal layer. Further, 0.23 mL of the electrolyte 1 was put into the bag. The bag was then heat-sealed while pressure inside the bag was reduced, so that a nonaqueous electrolyte secondary battery 1 was prepared.

Thereafter, a cycle characteristic of the nonaqueous electrolyte secondary battery 1, that is, a capacity maintenance rate (%) after 100 charge-discharge cycles was measured. Table 1 shows a result of measuring the capacity maintenance rate (%) after 100 charge-discharge cycles.

Example 2

[Preparation of Nonaqueous Electrolyte Secondary Battery]

(Preparation of Electrolyte)

Diethyl carbonate was added to 10.3 mg of dibutylhydroxytoluene (having an ionic conductance decreasing rate of 5.3%) serving as an additive, and the additive was dissolved in the diethyl carbonate to obtain 5 mL of an additive solution 2. Then, 90 μL of the additive solution 2 and 1910 μL of an undiluted solution 1 of an electrolyte were mixed to obtain an electrolyte 2.

(Assembly of Nonaqueous Electrolyte Secondary Battery)

A nonaqueous electrolyte secondary battery was prepared as in Example 1, except that the electrolyte 2 was used instead of the electrolyte 1. The nonaqueous electrolyte secondary battery thus prepared was employed as a nonaqueous electrolyte secondary battery 2.

Thereafter, a cycle characteristic of the nonaqueous electrolyte secondary battery 2, that is, a capacity maintenance rate (%) after 100 charge-discharge cycles was measured. Table 1 shows a result of measuring the capacity maintenance rate (%) after 100 charge-discharge cycles.

Example 3

[Preparation of Nonaqueous Electrolyte Secondary Battery]

(Preparation of Electrolyte)

An electrolyte 3 was obtained by mixing 45 μL of an additive solution 1 and 1955 μL of an undiluted solution 1 of an electrolyte.

(Assembly of Nonaqueous Electrolyte Secondary Battery)

A nonaqueous electrolyte secondary battery was prepared as in Example 1, except that the electrolyte 3 was used instead of the electrolyte 1. The nonaqueous electrolyte secondary battery thus prepared was employed as a nonaqueous electrolyte secondary battery 3.

Thereafter, a cycle characteristic of the nonaqueous electrolyte secondary battery 3, that is, a capacity maintenance rate (%) after 100 charge-discharge cycles was measured. Table 1 shows a result of measuring the capacity maintenance rate (%) after 100 charge-discharge cycles.

Example 4

[Preparation of Nonaqueous Electrolyte Secondary Battery]

(Preparation of Electrolyte)

An electrolyte 4 was obtained by mixing 180 μL of an additive solution 1 and 1820 μL of an undiluted solution 1 of an electrolyte.

(Assembly of Nonaqueous Electrolyte Secondary Battery)

A nonaqueous electrolyte secondary battery was prepared as in Example 1, except that the electrolyte 4 was used instead of the electrolyte 1. The nonaqueous electrolyte secondary battery thus prepared was employed as a nonaqueous electrolyte secondary battery 4.

Thereafter, a cycle characteristic of the nonaqueous electrolyte secondary battery 4, that is, a capacity maintenance rate (%) after 100 charge-discharge cycles was measured. Table 1 shows a result of measuring the capacity maintenance rate (%) after 100 charge-discharge cycles.

Example 5

[Preparation of Nonaqueous Electrolyte Secondary Battery]

(Preparation of Electrolyte)

Diethyl carbonate was added to 10.0 mg of vinylene carbonate (having an ionic conductance decreasing rate of 1.3% serving as an additive, and the additive was dissolved in the diethyl carbonate to obtain 5 mL of an additive solution 3. Then, 90 μL of the additive solution 3 and 1910 μL of an undiluted solution 1 of an electrolyte were mixed to obtain an electrolyte 5.

(Assembly of Nonaqueous Electrolyte Secondary Battery)

A nonaqueous electrolyte secondary battery was prepared as in Example 1, except that the electrolyte 5 was used instead of the electrolyte 1. The nonaqueous electrolyte secondary battery thus prepared was employed as a nonaqueous electrolyte secondary battery 5.

Thereafter, a cycle characteristic of the nonaqueous electrolyte secondary battery 5, that is, a capacity maintenance rate (%) after 100 charge-discharge cycles was measured. Table 1 shows a result of measuring the capacity maintenance rate (%) after 100 charge-discharge cycles.

Example 6

[Preparation of Nonaqueous Electrolyte Secondary Battery Separator]

A polyolefin porous film was obtained as in Example 1, except that a sheet cleaned with use of a cleaning liquid (heptane) was left to stand still at 134° C. for 16 minutes so that the sheet was dried and heat-fixed. The polyolefin porous film thus obtained was employed as a nonaqueous electrolyte secondary battery separator 2.

Thereafter, physical properties of the nonaqueous electrolyte secondary battery separator 2 were measured by the above-described measurement methods. The nonaqueous electrolyte secondary battery separator 2 had a film thickness of 12 μm and an air permeability of 124 sec/100 mL. Table 1 shows the physical properties thus measured of the nonaqueous electrolyte secondary battery separator 2.

[Preparation of Nonaqueous Electrolyte Secondary Battery]

A nonaqueous electrolyte secondary battery was prepared as in Example 1, except that the nonaqueous electrolyte secondary battery separator 2 was used instead of the nonaqueous electrolyte secondary battery separator 1. The nonaqueous electrolyte secondary battery thus prepared was employed as a nonaqueous electrolyte secondary battery 6.

Thereafter, a cycle characteristic of the nonaqueous electrolyte secondary battery 6, that is, a capacity maintenance rate (%) after 100 charge-discharge cycles was measured. Table 1 shows a result of measuring the capacity maintenance rate (%) after 100 charge-discharge cycles.

Example 7

[Preparation of Nonaqueous Electrolyte Secondary Battery]

(Preparation of Electrolyte)

An electrolyte 6 was obtained by mixing 20 μL of an additive solution 1 and 1980 μL of an undiluted solution 1 of an electrolyte.

(Assembly of Nonaqueous Electrolyte Secondary Battery)

A nonaqueous electrolyte secondary battery was prepared as in Example 1, except that the electrolyte 6 was used instead of the electrolyte 1. The nonaqueous electrolyte secondary battery thus prepared was employed as a nonaqueous electrolyte secondary battery 7.

Thereafter, a cycle characteristic of the nonaqueous electrolyte secondary battery 7, that is, a capacity maintenance rate (%) after 100 charge-discharge cycles was measured.

Table 1 shows a result of measuring the capacity maintenance rate (%) after 100 charge-discharge cycles.

Example 8

[Preparation of Nonaqueous Electrolyte Secondary Battery]
(Preparation of Electrolyte)
An electrolyte 7 was obtained by mixing 50 µL of an electrolyte 6 and 1950 µL of an undiluted solution 1 of an electrolyte.
(Assembly of Nonaqueous Electrolyte Secondary Battery)
A nonaqueous electrolyte secondary battery was prepared as in Example 1, except that the electrolyte 7 was used instead of the electrolyte 1. The nonaqueous electrolyte secondary battery thus prepared was employed as a nonaqueous electrolyte secondary battery 8.
Thereafter, a cycle characteristic of the nonaqueous electrolyte secondary battery 8, that is, a capacity maintenance rate (%) after 100 charge-discharge cycles was measured. Table 1 shows a result of measuring the capacity maintenance rate (%) after 100 charge-discharge cycles.

Example 9

[Preparation of Nonaqueous Electrolyte Secondary Battery]
(Preparation of Electrolyte)
$LiPF_6$ was dissolved in a mixed solvent, in which ethylene carbonate and diethyl carbonate were mixed at a volume ratio of 3:7, so that a concentration of the $LiPF_6$ became 1 mol/L. A solution thus obtained was employed as an undiluted solution 2 of an electrolyte. Then, 90 µL of an additive solution 1 and 1910 µL of the undiluted solution 2 of an electrolyte were mixed to obtain an electrolyte 8.
(Assembly of Nonaqueous Electrolyte Secondary Battery)
A nonaqueous electrolyte secondary battery was prepared as in Example 1, except that the electrolyte 8 was used instead of the electrolyte 1. The nonaqueous electrolyte secondary battery thus prepared was employed as a nonaqueous electrolyte secondary battery 9.
Thereafter, a cycle characteristic of the nonaqueous electrolyte secondary battery 9, that is, a capacity maintenance rate (%) after 100 charge-discharge cycles was measured. Table 1 shows a result of measuring the capacity maintenance rate (%) after 100 charge-discharge cycles.

Example 10

[Preparation of Nonaqueous Electrolyte Secondary Battery]
(Preparation of Electrolyte)
$LiPF_6$ was dissolved in a mixed solvent, in which ethylene carbonate, ethyl methyl carbonate, and diethyl carbonate were mixed at a volume ratio of 4:4:2, so that a concentration of the $LiPF_6$ became 1 mol/L. A solution thus obtained was employed as an undiluted solution 3 of an electrolyte. Then, 90 µL of an additive solution 1 and 1910 µL of the undiluted solution 3 of an electrolyte were mixed to obtain an electrolyte 9.
(Assembly of Nonaqueous Electrolyte Secondary Battery)
A nonaqueous electrolyte secondary battery was prepared as in Example 1, except that the electrolyte 9 was used instead of the electrolyte 1. The nonaqueous electrolyte secondary battery thus prepared was employed as a nonaqueous electrolyte secondary battery 10.
Thereafter, a cycle characteristic of the nonaqueous electrolyte secondary battery 10, that is, a capacity maintenance rate (%) after 100 charge-discharge cycles was measured. Table 1 shows a result of measuring the capacity maintenance rate (%) after 100 charge-discharge cycles.

Example 11

[Preparation of Nonaqueous Electrolyte Secondary Battery]
(Preparation of Electrolyte)
$LiPF_6$ was dissolved in a mixed solvent, in which ethylene carbonate, ethyl methyl carbonate, and diethyl carbonate were mixed at a volume ratio of 2:5:3, so that a concentration of the $LiPF_6$ became 1 mol/L. A solution thus obtained was employed as an undiluted solution 4 of an electrolyte. Then, 90 µL of an additive solution 1 and 1910 µL of the undiluted solution 4 of an electrolyte were mixed to obtain an electrolyte 10.
(Assembly of Nonaqueous Electrolyte Secondary Battery)
A nonaqueous electrolyte secondary battery was prepared as in Example 1, except that the electrolyte 10 was used instead of the electrolyte 1. The nonaqueous electrolyte secondary battery thus prepared was employed as a nonaqueous electrolyte secondary battery 11.
Thereafter, a cycle characteristic of the nonaqueous electrolyte secondary battery 11, that is, a capacity maintenance rate (%) after 100 charge-discharge cycles was measured. Table 1 shows a result of measuring the capacity maintenance rate (%) after 100 charge-discharge cycles.

Comparative Example 1

[Preparation of Nonaqueous Electrolyte Secondary Battery Separator]
A polyolefin porous film was obtained as in Example 1, except that (i) 20 parts by weight of an ultra-high molecular weight polyethylene powder (HI-ZEX MILLION 145M, manufactured by Mitsui Chemicals, Inc.) was solely prepared and a petroleum resin was not prepared and (ii) a temperature inside a twin screw kneading extruder immediately before liquid paraffin was fed to the twin screw kneading extruder was set to 134° C. The polyolefin porous film thus obtained was employed as a nonaqueous electrolyte secondary battery separator 3.
Thereafter, physical properties of the nonaqueous electrolyte secondary battery separator 3 were measured by the above-described measurement methods. The nonaqueous electrolyte secondary battery separator 3 had a film thickness of 24 µm and an air permeability of 160 sec/100 mL. Table 1 shows the physical properties thus measured of the nonaqueous electrolyte secondary battery separator 3.
[Preparation of Nonaqueous Electrolyte Secondary Battery]
(Preparation of Electrolyte)
Diethyl carbonate was added to 10.0 mg of triethyl phosphate (having an ionic conductance decreasing rate of 2.3%) serving as an additive, and the additive was dissolved in the diethyl carbonate to obtain 5 mL of an additive solution 4. Then, 45 µL, of the additive solution 4 and 1955 µL, of an undiluted solution 1 of an electrolyte were mixed to obtain an electrolyte 11.

(Assembly of Nonaqueous Electrolyte Secondary Battery)

A nonaqueous electrolyte secondary battery was prepared as in Example 1, except that (i) the nonaqueous electrolyte secondary battery separator 3 was used instead of the nonaqueous electrolyte secondary battery separator 1 and (ii) the electrolyte 11 was used instead of the electrolyte 1. The nonaqueous electrolyte secondary battery thus prepared was employed as a nonaqueous electrolyte secondary battery 12.

Thereafter, a cycle characteristic of the nonaqueous electrolyte secondary battery 12, that is, a capacity maintenance rate (%) after 100 charge-discharge cycles was measured. Table 1 shows a result of measuring the capacity maintenance rate (%) after 100 charge-discharge cycles.

Comparative Example 2

[Preparation of Nonaqueous Electrolyte Secondary Battery]

(Preparation of Electrolyte)

An electrolyte 12 was obtained by mixing 180 μL of an additive solution 4 and 1820 μL of an undiluted solution 1 of an electrolyte.

(Assembly of Nonaqueous Electrolyte Secondary Battery)

A nonaqueous electrolyte secondary battery was prepared as in Example 1, except that (i) a nonaqueous electrolyte secondary battery separator 3 was used instead of the nonaqueous electrolyte secondary battery separator 1 and (ii) the electrolyte 12 was used instead of the electrolyte 1. The nonaqueous electrolyte secondary battery thus prepared was employed as a nonaqueous electrolyte secondary battery 13.

Thereafter, a cycle characteristic of the nonaqueous electrolyte secondary battery 13, that is, a capacity maintenance rate (%) after 100 charge-discharge cycles was measured. Table 1 shows a result of measuring the capacity maintenance rate (%) after 100 charge-discharge cycles.

Comparative Example 3

[Preparation of Nonaqueous Electrolyte Secondary Battery]

A nonaqueous electrolyte secondary battery was prepared as in Example 1, except that (i) a nonaqueous electrolyte secondary battery separator 3 was used instead of the nonaqueous electrolyte secondary battery separator 1 and (ii) an electrolyte 2, prepared in Example 2, was used instead of the electrolyte 1. The nonaqueous electrolyte secondary battery thus prepared was employed as a nonaqueous electrolyte secondary battery 14.

Thereafter, a cycle characteristic of the nonaqueous electrolyte secondary battery 14, that is, a capacity maintenance rate (%) after 100 charge-discharge cycles was measured. Table 1 shows a result of measuring the capacity maintenance rate (%) after 100 charge-discharge cycles.

Comparative Example 4

[Preparation of Nonaqueous Electrolyte Secondary Battery]

(Preparation of Electrolyte)

Diethyl carbonate was added to 10.8 mg of tris-(4-t-butyl-2,6-di-methyl-3-hydroxybenzyl)isocyanurate (having an ionic conductance decreasing rate of 6.1%) serving as an additive, and the additive was dissolved in the diethyl carbonate to obtain 5 mL of an additive solution 5. Then, 90 μL of the additive solution 5 and 1910 μL of an undiluted solution 1 of an electrolyte were mixed to obtain an electrolyte 13.

(Assembly of Nonaqueous Electrolyte Secondary Battery)

A nonaqueous electrolyte secondary battery was prepared as in Example 1, except that the electrolyte 13 was used instead of the electrolyte 1. The nonaqueous electrolyte secondary battery thus prepared was employed as a nonaqueous electrolyte secondary battery 15.

Thereafter, a cycle characteristic of the nonaqueous electrolyte secondary battery 15, that is, a capacity maintenance rate (%) after 100 charge-discharge cycles was measured. Table 1 shows a result of measuring the capacity maintenance rate (%) after 100 charge-discharge cycles.

Comparative Example 5

[Preparation of Nonaqueous Electrolyte Secondary Battery]

A nonaqueous electrolyte secondary battery was prepared as in Example 1, except that a nonaqueous electrolyte secondary battery separator 3 was used instead of the nonaqueous electrolyte secondary battery separator 1. The nonaqueous electrolyte secondary battery thus prepared was employed as a nonaqueous electrolyte secondary battery 16.

Thereafter, a cycle characteristic of the nonaqueous electrolyte secondary battery 16, that is, a capacity maintenance rate (%) after 100 charge-discharge cycles was measured. Table 1 shows a result of measuring the capacity maintenance rate (%) after 100 charge-discharge cycles.

Comparative Example 6

[Preparation of Nonaqueous Electrolyte Secondary Battery]

(Preparation of Electrolyte)

An electrolyte 14 was obtained by mixing 400 μL of an additive solution 1 and 1600 μL of an undiluted solution 1 of an electrolyte.

(Assembly of Nonaqueous Electrolyte Secondary Battery)

A nonaqueous electrolyte secondary battery was prepared as in Example 1, except that the electrolyte 14 was used instead of the electrolyte 1. The nonaqueous electrolyte secondary battery thus prepared was employed as a nonaqueous electrolyte secondary battery 17.

Thereafter, a cycle characteristic of the nonaqueous electrolyte secondary battery 17, that is, a capacity maintenance rate (%) after 100 charge-discharge cycles was measured. Table 1 shows a result of measuring the capacity maintenance rate (%) after 100 charge-discharge cycles.

Comparative Example 7

[Preparation of Nonaqueous Electrolyte Secondary Battery]

(Assembly of Nonaqueous Electrolyte Secondary Battery)

A nonaqueous electrolyte secondary battery was prepared as in Example 1, except that an undiluted solution 1 of an electrolyte was used instead of the electrolyte 1. The nonaqueous electrolyte secondary battery thus prepared was employed as a nonaqueous electrolyte secondary battery 18.

Thereafter, a cycle characteristic of the nonaqueous electrolyte secondary battery 18, that is, a capacity maintenance rate (%) after 100 charge-discharge cycles was measured. Table 1 shows a result of measuring the capacity maintenance rate (%) after 100 charge-discharge cycles.

[Results]

Table 1 below shows (i) physical properties (ion permeability barrier energy per unit film thickness, unit: J/mol/μm) of nonaqueous electrolyte secondary battery separators prepared in Examples 1 through 11 and Comparative Examples 1 through 7, (ii) ionic conductance decreasing rates of additives used in Examples 1 through 11 and Comparative Examples 1 through 7, (iii) amounts of the additives contained in electrolytes (shown as "amount of additive" in Table 1) prepared in Examples 1 through 11 and Comparative Examples 1 through 7, and (iv) cycle characteristics (capacity maintenance rates after 100 charge-discharge cycles, unit: %) of nonaqueous electrolyte secondary batteries prepared in Examples 1 through 11 and Comparative Examples 1 through 7.

TABLE 1

| | Ion permeability barrier energy per unit film thickness [J/mol/μm] | Ionic conductance decreasing rate [%] | Amount of additive [ppm] | Capacity maintenance rate after 100 charge-discharge cycles [%] |
|---|---|---|---|---|
| Example 1 | 320 | 4.0 | 90 | 91.8 |
| Example 2 | 320 | 5.3 | 90 | 91.8 |
| Example 3 | 320 | 4.0 | 45 | 92.3 |
| Example 4 | 320 | 4.0 | 180 | 92.5 |
| Example 5 | 320 | 1.3 | 90 | 92.1 |
| Example 6 | 780 | 4.0 | 90 | 92.4 |
| Example 7 | 320 | 4.0 | 20 | 90.9 |
| Example 8 | 320 | 4.0 | 0.5 | 91.0 |
| Example 9 | 320 | 4.0 | 90 | 91.1 |
| Example 10 | 320 | 4.0 | 90 | 91.1 |
| Example 11 | 320 | 4.0 | 90 | 90.6 |
| Comparative Example 1 | 290 | 2.3 | 45 | 86.5 |
| Comparative Example 2 | 290 | 2.3 | 180 | 86.0 |
| Comparative Example 3 | 290 | 5.3 | 90 | 87.5 |
| Comparative Example 4 | 320 | 6.1 | 90 | 87.1 |
| Comparative Example 5 | 290 | 4.0 | 90 | 87.7 |
| Comparative Example 6 | 320 | 4.0 | 400 | 86.7 |
| Comparative Example 7 | 320 | — | — | 86.1 |

The nonaqueous electrolyte secondary batteries prepared in Examples 1 through 11 are each a nonaqueous electrolyte secondary battery including (i) a nonaqueous electrolyte secondary battery separator having ion permeability barrier energy of not less than 300 J/mol/μm and not more than 900 J/mol/μm per unit film thickness and (ii) a nonaqueous electrolyte containing an additive in an amount of not less than 0.5 ppm and not more than 300 ppm, the additive having an ionic conductance decreasing rate of not less than 1.0% and not more than 6.0%, the ionic conductance decreasing rate being calculated from (a) an ionic conductance of a reference electrolyte to which the additive has not been added and (b) an ionic conductance of the reference electrolyte in which the additive has been dissolved so that a concentration of the additive becomes 1.0% by weight. According to the nonaqueous electrolyte secondary batteries prepared in Comparative Examples 1 through 7, any one of the ion permeability barrier energy per unit film thickness, the ionic conductance decreasing rate, and the amount of the additive is outside the above-described scope. As is clear from Table 1, it was found that the nonaqueous electrolyte secondary batteries prepared in Examples 1 through 11 were more excellent in cycle characteristic than the nonaqueous electrolyte secondary batteries prepared in Comparative Examples 1 through 7. It was therefore found that, according to the nonaqueous electrolyte secondary batteries prepared in Examples 1 through 11, it is possible to suppress a deterioration of a battery characteristic which deterioration is caused by charge and discharge, as compared with the nonaqueous electrolyte secondary batteries prepared in Comparative Examples 1 through 7.

INDUSTRIAL APPLICABILITY

A nonaqueous electrolyte secondary battery in accordance with an embodiment of the present invention is excellent in cycle characteristic. It is therefore possible to suitably use the nonaqueous electrolyte secondary battery in accordance with an embodiment of the present invention as a battery for, for example, a personal computer, a mobile telephone, a portable information terminal, and a vehicle.

The invention claimed is:

1. A nonaqueous electrolyte secondary battery comprising:
a nonaqueous electrolyte secondary battery separator having ion permeability barrier energy of not less than 300 J/mol/μm and not more than 900 J/mol/μm per unit film thickness; and
a nonaqueous electrolyte containing an additive in an amount of not less than 0.5 ppm and not more than 300 ppm,
the additive being selected from the group consisting of pentaerythritol tetrakis[3-(3,5-di-tert-butyl-4-hydroxyphenyl)propionate], triethyl phosphate, vinylene carbonate, propanesultone, 2,6-di-tert-butyl-4-methyl phenol, 6-[3-(3-t-Butyl-4-hydroxy-5-methylphenyl)propoxy]-2,4,8,10-tetra-t-butyldibenzo[d,f][1,3,2]dioxaphosphepin, tris(2,4-di-tert-butylphenyl)phosphite, 2-[1-(2-Hydroxy-3,5-di-tert-pentylphenyl)ethyl]-4,6-di-tert-pentylphenyl acrylate, and dibutylhydroxytoluene,
the additive having an ionic conductance decreasing rate L of not less than 1.0% and not more than 6.0%, the ionic conductance decreasing rate L being represented by the following expression (A):

$$L=(LA-LB)/LA \qquad (A)$$

where: LA represents an ionic conductance (mS/cm) of a reference electrolyte obtained by dissolving $LiPF_6$ in a mixed solvent, containing ethylene carbonate, ethyl methyl carbonate, and diethyl carbonate at a volume ratio of 3:5:2, so that a concentration of the $LiPF_6$ becomes 1 mol/L;
LB represents an ionic conductance (mS/cm) of an electrolyte obtained by dissolving the additive in the reference electrolyte so that a concentration of the additive becomes 1.0% by weight with respect to a total weight of the electrolyte being 100%;
LA and LB are measured using an electric conductivity meter at 25° C.; and
the ion permeability barrier energy per unit film thickness is obtained by dividing an activation energy which charge carriers consume while passing through the nonaqueous electrolyte secondary battery separator during battery operation by a film thickness of the nonaqueous electrolyte secondary battery separator, wherein the ion permeability barrier energy per unit film thickness is calculated by:

cutting the nonaqueous electrolyte secondary battery separator into a disc-shaped piece having a diameter of 17 mm, sandwiching the disc-shaped piece is sandwiched between two SUS plates each having a thickness of 0.5 mm and a diameter of 15.5 mm to form a cell, injecting the reference electrolyte into the cell to produce a CR2032 type coin cell, placing the coin cell in a thermostatic bath set to a given temperature, obtaining a Nyquist plot using an alternating current impedance apparatus at a frequency of 1 MHz to 0.1 Hz and an amplitude of 10 mV, determining a solution resistance $r_0$ of the nonaqueous electrolyte secondary battery separator at the given temperature from a value of an X intercept of the Nyquist plot, calculating the ion permeability barrier energy of the nonaqueous electrolyte secondary battery separator using formula (2) while setting the given temperature to 50° C., 25° C., 5° C., and −10° C., $$\ln(k)=\ln(1/r_0)=\ln A - Ea/RT \quad (2)$$

Ea: ion permeability barrier energy (J/mol)
k: a reaction constant
$r_0$: a solution resistance (Ω)
A: a frequency factor
R: a gas constant=8.314 J/mol/K
T: the given temperature of the thermostatic bath (K), determining −Ea/R from formula (2), wherein −Ea/R is a slope of a straight line obtained by (i) plotting $\ln(1/r_0)$ with respect to a reciprocal of each temperature and (ii) applying a least squares method to the plot thus obtained, and dividing Ea by the film thickness of the nonaqueous electrolyte secondary battery separator to yield the ion permeability barrier energy per unit film thickness.

2. The nonaqueous electrolyte secondary battery as set forth in claim 1, wherein a capacity maintenance rate after 100 charge-discharge cycles is not less than 90%.

* * * * *